(12) United States Patent
Abraham

(10) Patent No.: US 9,762,519 B2
(45) Date of Patent: *Sep. 12, 2017

(54) CONVERGENCE OF SOCIAL ENTERPRISE AND DIGITAL TELEPHONY

(71) Applicant: International Business Machines Corporation, Armonk, NY (US)

(72) Inventor: Subil M. Abraham, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,707

(22) Filed: Jul. 28, 2016

(65) Prior Publication Data

US 2017/0195271 A1    Jul. 6, 2017

Related U.S. Application Data

(63) Continuation of application No. 14/984,712, filed on Dec. 30, 2015, now Pat. No. 9,456,010.

(51) Int. Cl.
*H04M 3/42* (2006.01)
*H04L 12/58* (2006.01)
*H04L 29/08* (2006.01)

(52) U.S. Cl.
CPC .............. *H04L 51/16* (2013.01); *H04L 51/12* (2013.01); *H04L 51/32* (2013.01); *H04L 67/10* (2013.01)

(58) Field of Classification Search
CPC ......... H04L 51/16; H04L 51/12; H04L 51/32; H04L 65/1093; H04L 65/403; H04M 3/564; H04M 7/0051

USPC ............................................. 379/202.01, 158
See application file for complete search history.

(56) References Cited

U.S. PATENT DOCUMENTS

| | | | |
|---|---|---|---|
| 8,886,782 B2 | 11/2014 | Lucero et al. | |
| 2006/0277191 A1 | 12/2006 | Badovinatz et al. | |
| 2006/0277564 A1 | 12/2006 | Jarman | |
| 2008/0233933 A1* | 9/2008 | Gilbert .................... | H04M 3/56 455/416 |

(Continued)

OTHER PUBLICATIONS

List of IBM Patents or Patent Applications Treated as Related Form.

(Continued)

*Primary Examiner* — William Deane, Jr.
(74) *Attorney, Agent, or Firm* — Sherman IP LLP; Kenneth L. Sherman; Steven Laut

(57) ABSTRACT

Integrating digital telephony information with a social platform includes receiving, by a processor, information for multiple parties connected to a conference telephone call. Virtual groups for the multiple parties are created. Permissions are assigned to each of the virtual groups. Muting of portions of the conference telephone call related to a discussion of a particular topic is controlled based on permissions. Clips from the conference telephone call and actions are captured. A social enterprise platform is connected to and a recording is automatically uploaded after the conference telephone call has ended. Permissions are synchronized across the social enterprise platform. Media sources are linked together. Context across the linked media sources is provided. The captured clips and the actions are integrated.

1 Claim, 6 Drawing Sheets

(56) References Cited

U.S. PATENT DOCUMENTS

| | | | |
|---|---|---|---|
| 2009/0113316 A1* | 4/2009 | Palermo | G06Q 30/02 |
| | | | 715/758 |
| 2010/0034366 A1 | 2/2010 | Basson et al. | |
| 2011/0047490 A1* | 2/2011 | Badovinatz | G06Q 10/10 |
| | | | 715/764 |
| 2011/0270923 A1 | 11/2011 | Jones et al. | |
| 2013/0060859 A1 | 3/2013 | Olsen et al. | |
| 2013/0151622 A1 | 6/2013 | Goel et al. | |
| 2013/0297690 A1 | 11/2013 | Lucero et al. | |
| 2014/0067951 A1 | 3/2014 | Sheinfeld | |
| 2014/0184586 A1 | 7/2014 | Kelley et al. | |
| 2015/0033153 A1 | 1/2015 | Knysz et al. | |
| 2015/0070587 A1 | 3/2015 | Emeott et al. | |
| 2015/0363733 A1 | 12/2015 | Brown | |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.
U.S. Non-Final Office Action for U.S. Appl. No. 14/984,712 mailed Feb. 2, 2016.
U.S. Final Office Action for U.S. Appl. No. 14/984,712 mailed Mar. 22, 2016.
U.S. Notice of Allowance for U.S. Appl. No. 14/984,712 mailed May 27, 2016.

\* cited by examiner

CONVERGENCE OF SOCIAL ENTERPRISE AND DIGITAL TELEPHONY

BACKGROUND

An innovative enterprise is constantly involved in the growth of their employee's skills sets and promotes their involvement and engagement in several communities. For example, some companies may have their employees spend a certain amount of time per year for improving skills. The dissemination of data to employees may include many separate channels, such as conference calls, community calls, blogs, wikis, media storage (recorded audio and video data).

SUMMARY

Embodiments relate to integrating digital telephony with social enterprise. One embodiment includes a method for integrating digital telephony information with a social platform. The method comprises receiving, by a processor, information for multiple parties connected to a conference telephone call. Multiple virtual groups are created for the multiple parties connected to the conference telephone call. One or more permissions are assigned to each of the multiple virtual groups. Muting of portions of the conference telephone call related to a discussion of at least one particular topic for particular groups of the multiple virtual groups is controlled based on the one or more permissions, wherein the conference telephone call is unmuted to the particular groups after completion of the discussion. Clips from the conference telephone call and actions comprising communications and comments related to the conference telephone call along with bookmarks and timestamps are captured. A social enterprise platform is connected to and a recording including the clips, the actions, the bookmarks and the timestamps are automatically uploaded within the social enterprise platform after the conference telephone call has ended. The clips and the actions from the conference telephone call remain visible across the social enterprise platform. The assigned one or more permissions are synchronized across the social enterprise platform and the telephone conference call to control access to the clips and the actions based on the multiple virtual groups. A plurality of media sources are linked together consisting of email, chat, web conferences, communities, blogs, forum, files, activities and profiles. Context is provided across the linked plurality of media sources based on comments, the clips and the actions associated with the conference telephone call. The captured clips and the actions obtained from the telephone conference call are integrated with chat history and the linked plurality of media sources in the social enterprise platform to accelerate dissemination of information among an organization.

These and other features, aspects and advantages of the embodiments will become understood with reference to the following description, appended claims and accompanying figures.

DETAILED DESCRIPTION

Figure 1:
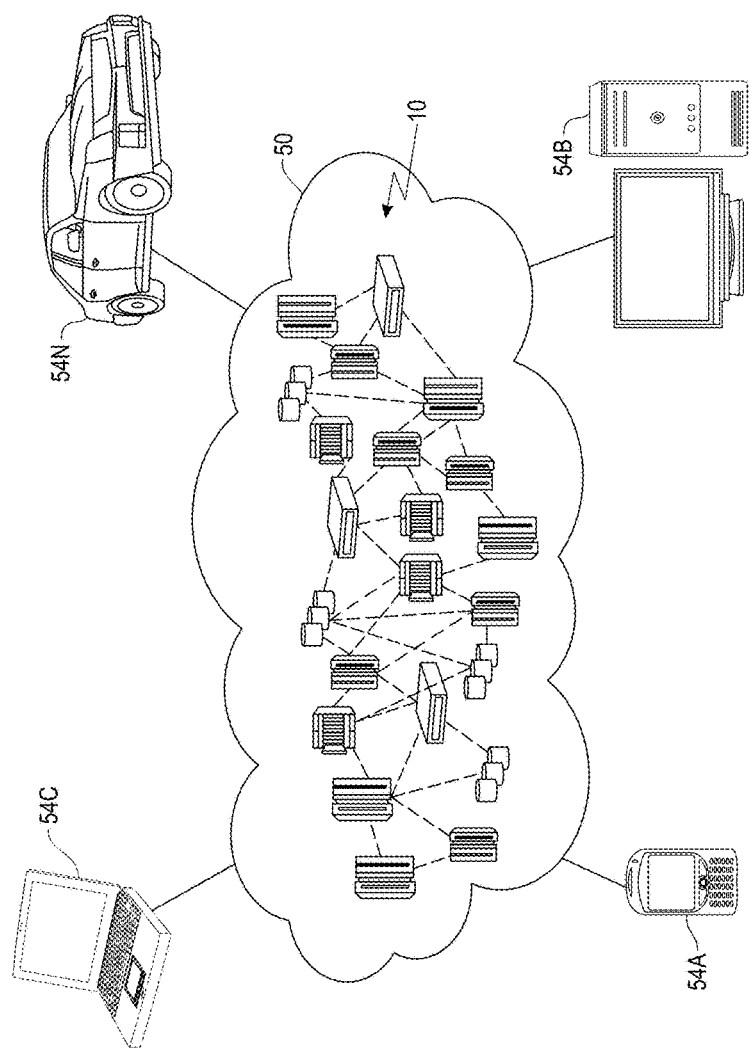
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some organizations have weekly conference calls. In one example, retail community conference calls may be held once a week for those who work in the retail industry. While the web-conference and telephony call is held live, the chat session serves as the medium for expressing comments and questions. The recorded calls may be stored in a media library for employees to access. The chat history and transcript of the call may also be saved as a bookmark to this session in the media library. The conference moderator/host may maintain a community on a social enterprise/platform for retail experts to exchange ideas and comments based on these web-conference sessions etc. In this example, several channels (telephony, chat, community, media storage, wiki, etc.) may be used for collaborating across a single community call that encourages collective employee engagement. However today these channels are managed in a very siloed fashion and are not integrated real time.

In one or more embodiments, a framework integrates the media content experience such that important events and thoughts are captured and transitioned to the different channels in a seamless manner. Capturing audience feedback obtained from a call, with the chat history and integrating it with the rest of the related media stored in the social enterprise platform accelerates the dissemination of information among the employees in an organization.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
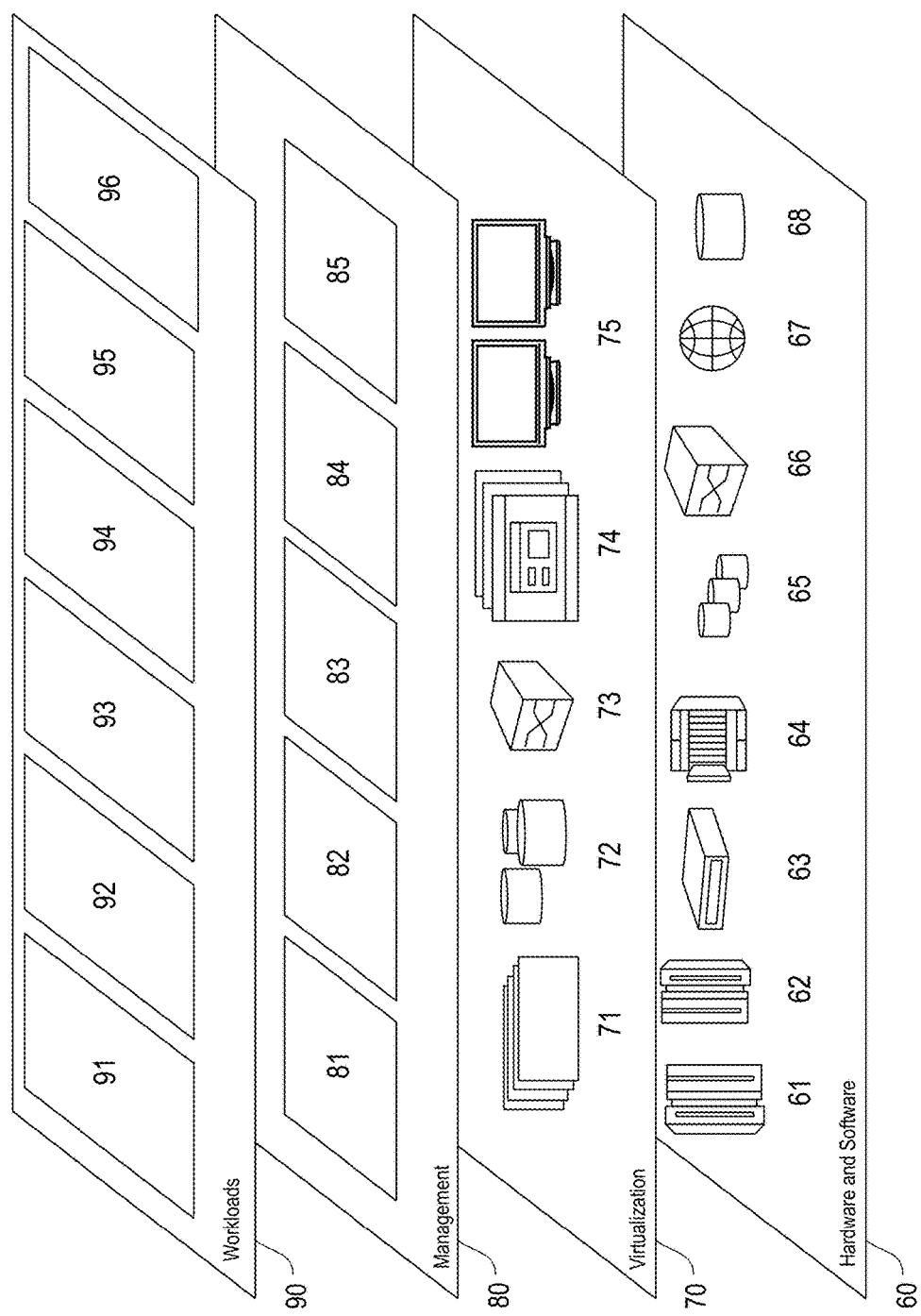
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and integration of telephony and social enterprise 96. As mentioned above, all of the foregoing examples described with respect to FIG. 2 are illustrative only, and the embodiments are not limited to these examples.

It is understood all functions of one or more embodiments as described herein may be typically performed in the computing environment 50 (FIG. 1), or the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
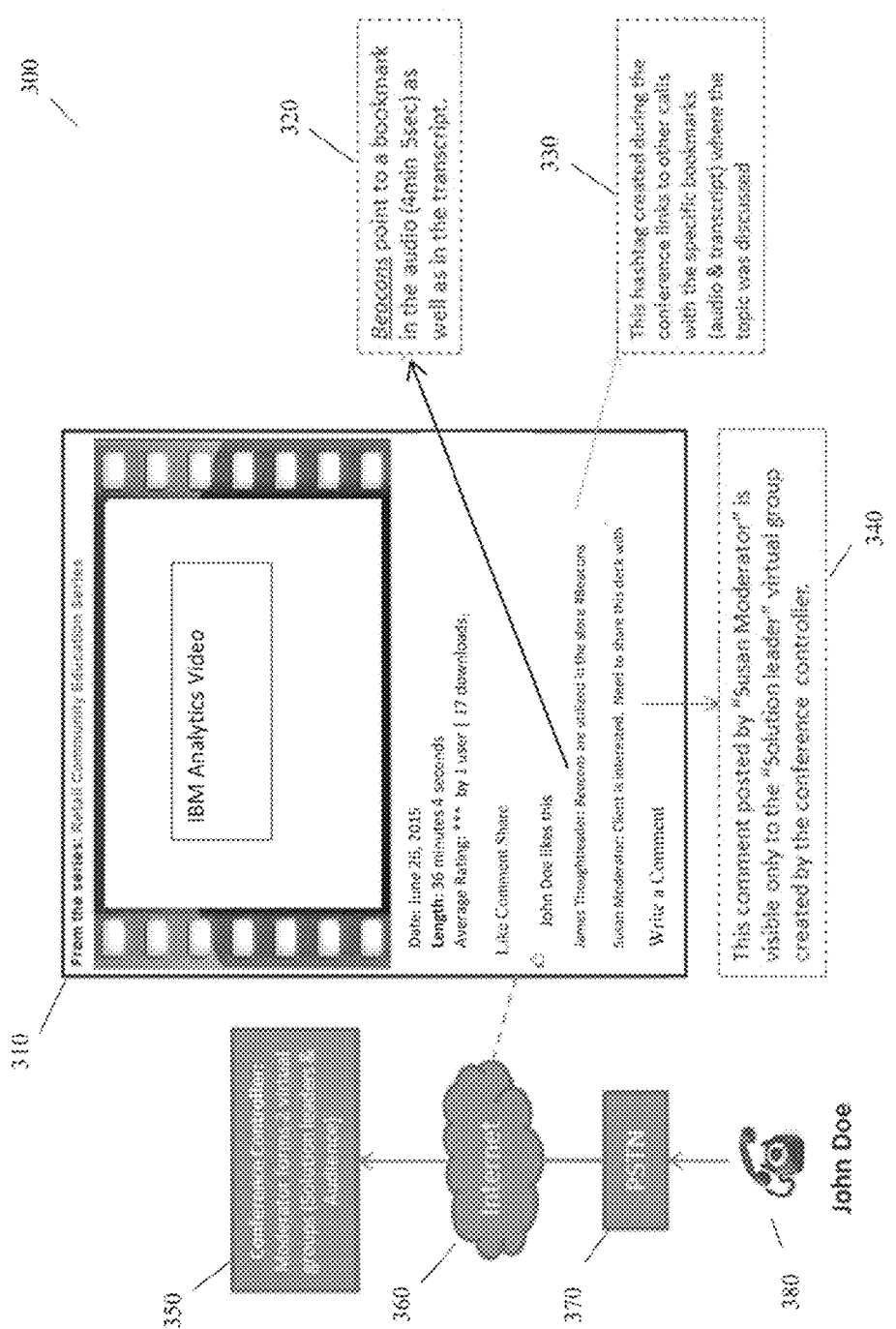
FIG. 3 is an example for integrating telephony on an enterprise social platform, according to an embodiment.

FIG. 3 is an example 300 for integrating telephony on an enterprise social platform, according to an embodiment. Example 300 shows a call 380 made from John Doe using the public switched telephone network (PSTN) 370 (or voice over internet protocol (VOIP)) that was just stored on an enterprise social platform through the Internet 360. In example 300, the conference moderator at the start of the call creates two virtual groups (Solution leaders and Audience) using the conference controller (processor device) 350. John Doe is an audience member who had joined the community call 380 through a phone line. At a particular point, John liked a comment 320 mentioned by the presenter on "Beacons" and posts a "like" action by dialing a set of characters on the phone line. Both the action as well as the bookmark (@ 4 min 15 sec) in the recording is stored. Once the recording is posted on the community, all the comments as well as the different actions are linked with this call. The posts/comments, stored call, etc. are displayable through a user interface 310. Later the user John Doe may expand on the action by posting a comment with a hashtag 330. Another user "James ThoughtLeader" posts a comments for the recording based on the bookmark John Doe created. Since "Beacons" has been a recurring hashtag in several of the previous historical recordings, it is able to provide a link to these recordings with the exact bookmarks where the topic was discussed. Similarly James ThoughtLeader has posted comments and spoken on several of these community calls and hence a community member is able to see the list of other calls with the exact bookmark where James have spoken or provided comments. In example 300, Susan Moderator posts a comment 340 for this recording that is only visible to the "Solution Leaders" virtual group. In one embodiment, this is a case where telephony group permissions are integrated with the online social enterprise platform.

In one or more embodiments, the digital telephony experience is integrated with the enterprise social platform that is linked together based on related topics (e.g., retail, Big Data, TeamSD, etc.). In one example, important actions and moments (i.e., clips of the call) in the telephony call may be captured and be made to surface on the enterprise social platform, which can be viewed by community members at a later point in time.

Figure 4:
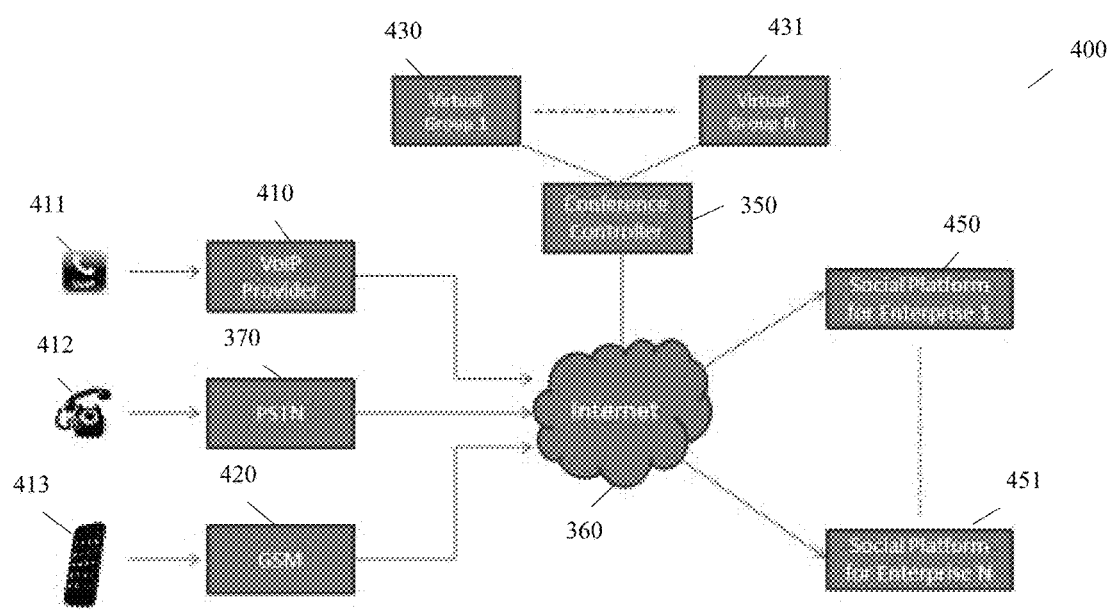
FIG. 4 shows an example block diagram for a system, according to an embodiment.

FIG. 4 shows an example block diagram for a system 400, according to an embodiment. In one embodiment, the system 400 includes a VoIP provider 410 that receives VoIP calls 411 to a conference call, a PSTN 370 that receives calls 412 to a conference call, a global system for mobile communications (GSM) 420 that receives wireless calls 413 for a conference call, the Internet 360, a conference controller 350 (that may create a virtual group 1 430 to virtual group N 431), and a social platform for enterprise 1 450 to social platform for enterprise N 451, where N is a positive integer.

In one embodiment, the conference controller 350 performs as a bridge between the telephony environment and the social enterprise platform 1 450 to social enterprise platform N 451. The conference controller 350 accepts connections from a wide variety of telephony networks both analog and digital such as PSTN 370, VoIP provider 410 and GSM 420. Once the conference controller 350 accepts a connection, it is able to keep track of members and associate roles to the members (e.g., audience, moderators, etc.) and create virtual groups (e.g., virtual group 1 430 to virtual group N 431). The conference controller 350 is connected to the social platform for enterprise 1 450 to social platform for enterprise N 451 via the Internet 360.

In order to facilitate the integration between a digital telephony conference and an enterprise social platform, the following are provided. One or more embodiments provide for creation of virtual groups (e.g., virtual group 1 430 to virtual group N 431) within a telephone conference call and applying of permissions to each of the virtual groups based on context. In one example, in an evaluation meeting (e.g., an invention disclosure team (IDT) meeting), there are typically multiple groups. For example, an IDT panel and the different inventor groups associated with the ideas that are being evaluated. During a review meeting, it may be desired to only want the IDT panel group and the current inventor group to be engaged in a dialogue on the conference line. All other groups are muted and hear silence on the call. When the current inventor group completes their discussion turn, the permissions of the next inventor group becomes active. In one embodiment, the virtual groups and permissions are dynamic and can be configured through the conference controller 350.

One or more embodiments provide for establishing a linkage from a conference call to a social platform for enterprise 1 450 to social platform for enterprise N 451 (e.g., group chat session, community, wikis, media storage, etc.). In one example, the permissions for media/content are preserved and synchronized across the different social platforms for enterprise. For example, during a meeting, a collaborative chat session may be automatically established across virtual groups if needed. If one team wants to pass materials or prior-art material to another "group A" the team may be established through the social tools (e.g., chat) tied to the virtual groups on the conference call.

One or more embodiments provide for recording an action posted by a user on the conference call and making it visible across the social enterprise platform. For example, an audience member John Doe on a phone conference line may hear a comment and record a "like," "comment" or "'Share" action by pressing a certain set of dial characters on the call based on hearing a comment by the speaker. Both the action as well as the bookmark (e.g., @ 4 min 15 sec.) in the recording is stored. Once the recording is posted on the community, all the comments as well as the different actions are linked with this call (e.g., accessed by the user interface 310). Later the user John Doe can expand on the action by posting a comment with a hashtag.

One or more embodiments provide for linking together a multiplicity of media sources and providing context across them based on the comments and actions associated with the recordings. In one example, a community may already have a set of previous recordings in its repository that have actions and comments associated with it. An existing conference call or new recording just posted may have a comment associated with it based on a hashtag (e.g., "Digital Convergence") or by a user "James ThoughtLeader." Since Digital Convergence has been a recurring hashtag in several of the previous historical recordings, it is able to provide a link to these recordings with the exact bookmarks where the topic was discussed. Similarly James ThoughtLeader has posted comments and spoken on several of these community calls and hence a community member is able to see the list of other calls with the exact bookmark where James has spoken or provided comments. This also complements a learning tool where a user is able to make effective use of his/her time to look through relevant conference clippings based on topics (e.g., Retail Internet of Things (IoT), Affective Computing in Retail, etc.) that makes sense for his/her role.

One or more embodiments provide for preserving group permissions across the enterprise social platform so that certain comments/actions/recording clips are visible to select groups. In one example, within a conference call, there may be three virtual groups: 1) Moderators, 2) Retail Industry Leaders and 3) Audience. Comments and actions posted by these groups (via the telephony line, chat session or the community) may be given limited visibility. For example, certain comments and actions posted by Retail Industry leaders may be visible only amongst themselves, but comments posted by the audience may be visible to everyone.

Figure 5:
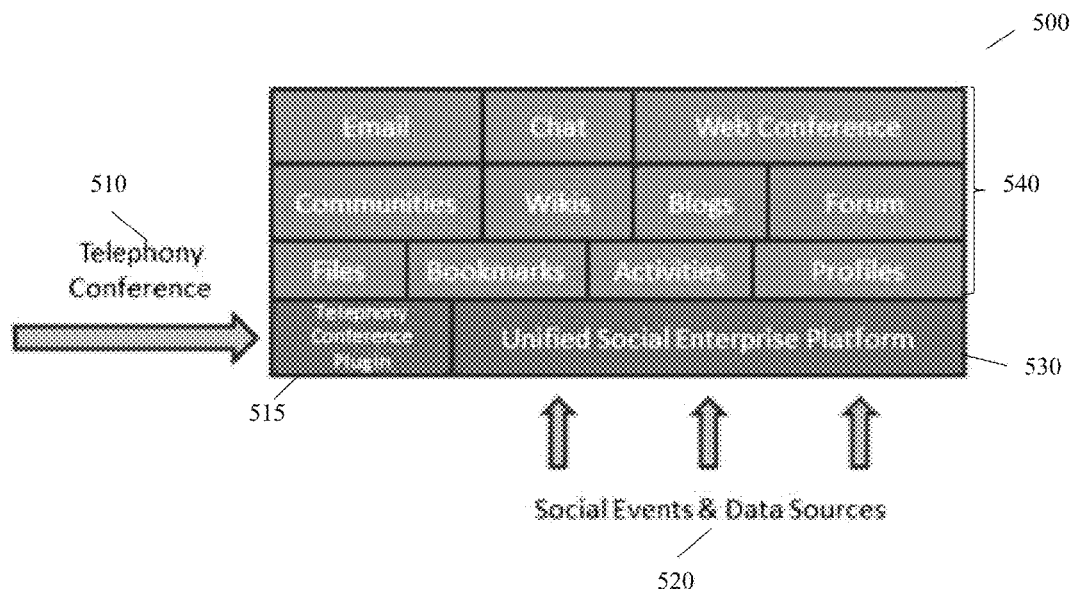
FIG. 5 shows an example framework and the components that make up the framework, according to an embodiment.

FIG. 5 shows an example framework 500 and the components that make up the framework, according to an embodiment. In one example, the various components that make up the framework 500 include media/content 540, such as email, chat, web conference, communities, Wikis, blogs, forum, files, bookmarks, activities, profiles, etc., telephony conference plugin 515 and unified social enterprise platform 530. The social platform of the framework 500 includes four layers each building on the previous one below. The telephony conference plugin 515 interacts with the conference controller 350 (FIGS. 3-4) to obtain the caller information and maps the virtual groups to users in profiles in the social platform. The social platform in addition listens to social events and data sources 520 and integrates that experience with the telephony environment. To understand the flow, during an existing telephony conference call 510 all the events and actions from the telephony users are recorded along with the bookmarks and hashtags. Once the community call has ended, the recording (e.g., mp3, wmv, mp4, etc.) is automatically uploaded along with session information to the media library. The recording is uploaded as a posting on the community website where the actions recorded on the call (e.g., like, share, etc.) are included as part of the posting. Community members can also add additional comments and tags after the call is posted as well. The virtual groups associated with the conference call are preserved in the social platform environment unless the moderator decides to change them later. Therefore, any actions or comments posted by a virtual group are governed or controlled by the permissions set forth by the conference controller 350.

Figure 6:
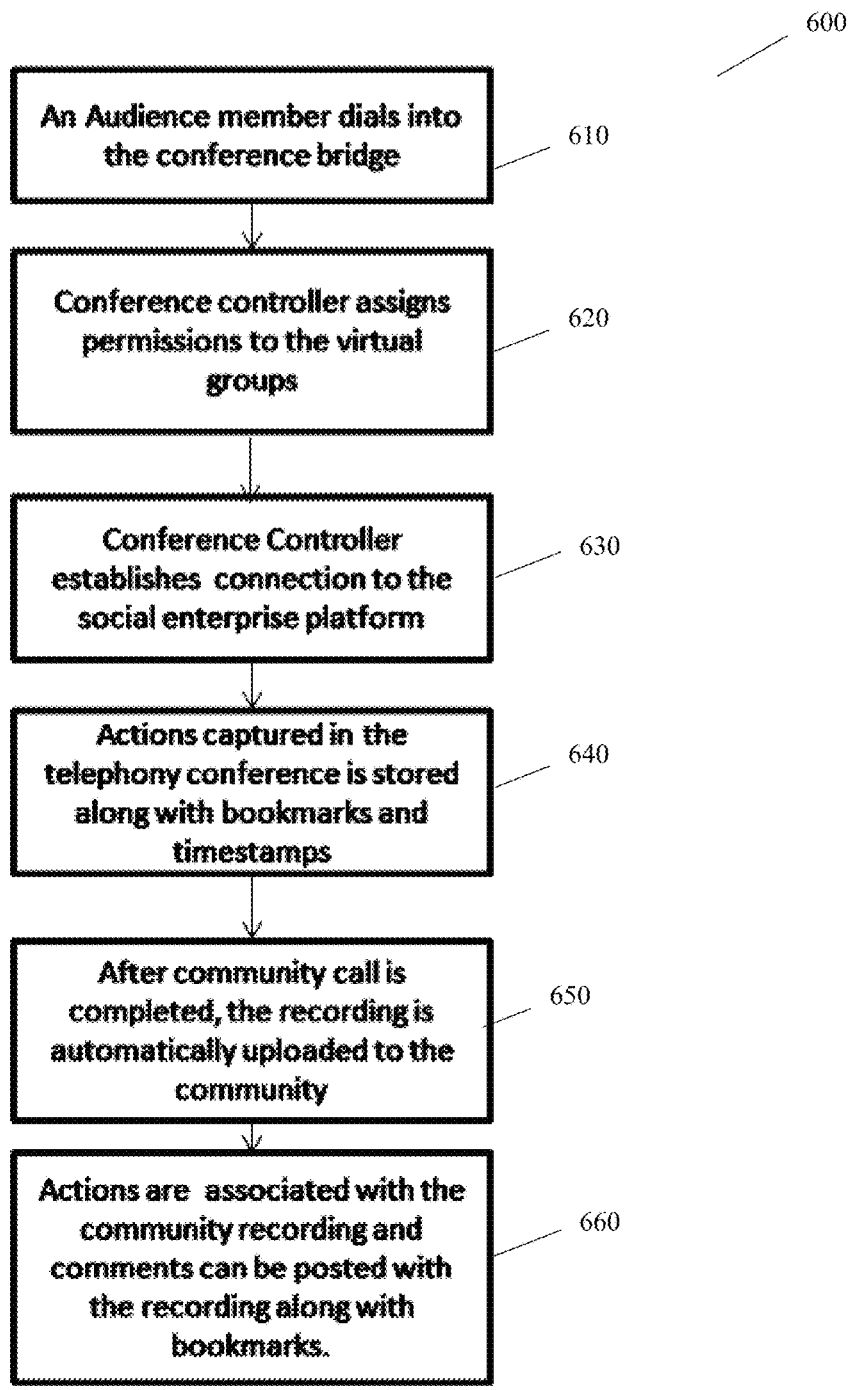
FIG. 6 illustrates a block diagram for a process for integrating digital telephony information with a social platform, according to one embodiment.

FIG. 6 illustrates a block diagram for a process 600 for integrating digital telephony information with a social platform for enterprise, according to one embodiment. In one embodiment, in block 610 an audience member dials into a conference bridge to join a conference call. In block 620 the conference controller (e.g., conference controller 350, FIGS. 3-4) assigns permissions (e.g., read, write, no access, etc.) to virtual groups created by the controller. In block 630 the conference controller establishes a connection to the social enterprise platform (e.g., via the Internet). In block 640 actions and clips are captured in the telephony conference are stored along with bookmarks and timestamps. In block 650, once the conference community call has ended, the recording is automatically uploaded to the community on the social enterprise platform. In block 660 actions are associated with the community recording and comments can be posted with the recording along with bookmarks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated.

What is claimed is:

1. A method for integrating digital telephony information with a social platform, the method comprising:
   receiving, by a processor, information for multiple parties connected to a conference telephone call;
   creating multiple virtual groups for the multiple parties connected to the conference telephone call;
   assigning one or more permissions to each of the multiple virtual groups;
   controlling muting of portions of the conference telephone call related to a discussion of at least one particular topic for particular groups of the multiple virtual groups based on the one or more permissions, wherein the conference telephone call is unmuted to the particular groups after completion of the discussion;
   capturing clips from the conference telephone call and actions comprising communications and comments related to the conference telephone call along with bookmarks and timestamps;

connecting to a social enterprise platform and automatically upload a recording including the clips, the actions, the bookmarks and the timestamps within the social enterprise platform after the conference telephone call has ended, wherein the clips and the actions from the conference telephone call remain visible across the social enterprise platform;

synchronizing the assigned one or more permissions across the social enterprise platform and the telephone conference call to control access to the clips and the actions based on the multiple virtual groups;

linking a plurality of media sources together consisting of email, chat, web conferences, communities, blogs, forum, files, activities and profiles;

providing context across the linked plurality of media sources based on comments, the clips and the actions associated with the conference telephone call; and integrating the captured clips and the actions obtained from the telephone conference call with chat history and the linked plurality of media sources in the social enterprise platform to accelerate dissemination of information among an organization.

\* \* \* \* \*